(12) United States Patent
Pater et al.

(10) Patent No.: US 9,511,452 B2
(45) Date of Patent: Dec. 6, 2016

(54) ASSEMBLIES WITH BRAZED JOINTS AND METHODS OF FABRICATING ASSEMBLIES WITH BRAZED JOINTS

(71) Applicant: UNITED TECHNOLOGIES CORPORATION, Farmington, CT (US)

(72) Inventors: Christopher M. Pater, Tolland, CT (US); Steven W. Burd, Cheshire, CT (US); Derk S. Philippona, Tolland, CT (US); Robert J. Sayers, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/616,842

(22) Filed: Feb. 9, 2015

(65) Prior Publication Data

US 2016/0228996 A1    Aug. 11, 2016

(51) Int. Cl.
| | |
|---|---|
| *B23K 31/02* | (2006.01) |
| *B23K 1/00* | (2006.01) |
| *B23K 1/20* | (2006.01) |
| *B23K 33/00* | (2006.01) |
| *B23K 3/08* | (2006.01) |

(52) U.S. Cl.
CPC ............ *B23K 31/02* (2013.01); *B23K 1/00* (2013.01); *B23K 1/0018* (2013.01); *B23K 1/20* (2013.01); *B23K 3/08* (2013.01); *B23K 33/00* (2013.01); *B23K 2201/001* (2013.01)

(58) Field of Classification Search
None
See application file for complete search history.

(56) References Cited

U.S. PATENT DOCUMENTS

| | | | | |
|---|---|---|---|---|
| 1,621,001 | A * | 3/1927 | Dimberg | B22D 19/00 164/109 |
| 3,029,505 | A * | 4/1962 | Reichenbaum | H01L 23/36 228/123.1 |
| 3,077,798 | A * | 2/1963 | Baker | A61B 17/1695 76/108.1 |
| 3,140,538 | A * | 7/1964 | Rutledge | B23K 1/0012 228/173.3 |
| 3,823,464 | A * | 7/1974 | Chartet | B21D 39/06 228/136 |

(Continued)

FOREIGN PATENT DOCUMENTS

| | | | | |
|---|---|---|---|---|
| DE | 3831692 A1 * | 3/1989 | | B23K 33/00 |
| DE | 102008047076 A1 | 3/2010 | | |

(Continued)

OTHER PUBLICATIONS

European Search Report and Communication; Application No. 16154810.2-1702; Date of Issue; Jul. 4, 2016; 9 pages.

*Primary Examiner* — Kiley Stoner
(74) *Attorney, Agent, or Firm* — Cantor Colburn LLP (57) ABSTRACT

An assembly may comprise a first part including a first surface, and a second part including a second surface and a bottom edge having sloped regions and at least one well between the sloped regions. The assembly may further comprise a brazed joint joining the first surface to the second surface. The at least one well may be configured to collect excess braze material from the brazed joint.

16 Claims, 5 Drawing Sheets

(56) References Cited

U.S. PATENT DOCUMENTS

| | | | |
|---|---|---|---|
| 4,439,250 A | | 3/1984 | Acharya et al. |
| 4,541,282 A | * | 9/1985 | Auerweck ............ G01L 19/0046 228/174 |
| 4,768,382 A | * | 9/1988 | Varrese ............... G01L 19/0046 228/165 |
| 4,877,083 A | * | 10/1989 | Saperstein ............ B23K 1/0012 138/94.3 |
| 5,200,368 A | * | 4/1993 | Kojima ..................... B23K 1/08 118/74 |
| 5,310,574 A | * | 5/1994 | Holtmann ............. B23K 1/0002 228/180.1 |
| 5,374,809 A | * | 12/1994 | Fox ......................... B23K 1/002 148/573 |
| 6,264,092 B1 | * | 7/2001 | Yasuda .................. B23K 1/001 228/161 |
| 8,684,257 B2 | * | 4/2014 | Osborne ............... H02K 17/165 228/165 |
| 2004/0013897 A1 | * | 1/2004 | Yano ..................... B23K 1/0008 428/548 |
| 2005/0049074 A1 | * | 3/2005 | Chen ..................... A63B 53/047 473/334 |
| 2010/0189568 A1 | * | 7/2010 | Watanabe ............ B23K 1/0018 416/90 R |
| 2011/0014054 A1 | * | 1/2011 | Nagler ..................... F01D 5/005 416/220 R |
| 2014/0332192 A1 | | 11/2014 | Cosby et al. |
| 2014/0341635 A1 | | 11/2014 | Lemke et al. |
| 2015/0325777 A1 | * | 11/2015 | Irie ..................... H01L 41/0475 347/50 |

FOREIGN PATENT DOCUMENTS

| | | | | |
|---|---|---|---|---|
| FR | 2516419 A1 | * | 5/1983 | ............ B23K 1/0016 |
| JP | 02299795 A | | 12/1990 | |
| JP | 105911 A | | 1/1998 | |
| JP | 2002079372 A | * | 3/2002 | |

\* cited by examiner

ASSEMBLIES WITH BRAZED JOINTS AND METHODS OF FABRICATING ASSEMBLIES WITH BRAZED JOINTS

FIELD OF THE DISCLOSURE

The present disclosure generally relates to assemblies having brazed joints, and more specifically, to assemblies having brazed joints with design features to control the flow of excess braze material and methods of fabricating such assemblies.

BACKGROUND

Brazing is a widely-used method for joining metallic parts. Brazing generally involves applying a braze filler material (e.g., a braze paste or a braze foil) at a joint gap between two closely fitting parts, followed by heating of the braze filler to a temperature sufficient to melt the braze filler to a braze liquid. The braze liquid may then distribute across the joint gap and wet the surfaces of the parts being joined by capillary action. In general, the braze filler may be applied at one side of the joint gap and may be permitted to flow through the joint gap to the other side when melted. When suitably distributed across the joint gap, the braze liquid may cool and harden to provide a brazed joint between the two parts.

In cases where excess braze filler is applied to the joint gap, the excess braze liquid may drip from the joint gap and flow to other locations of the part. If the flow of the excess braze liquid is uncontrolled, the excess braze liquid may drip randomly over the part, possibly reaching undesirable locations such as mating surfaces, fluid holes, or high stress regions of the part. For example, if the excess braze liquid flows over mating surfaces, the ability of the part to assemble with a mating part may be compromised. As another example, cooling or other fluid holes may be blocked by excess braze liquid, thereby interfering with the function of the part. In addition, loss of excess braze material may pose economic disadvantages as well, such as when precious metals are used in the braze filler composition.

Careful control of the braze filler material volume (or mass) and/or the joint gap may be used to prevent the dripping of excess braze liquid over the part. However, depending on the part geometry, it may be difficult or cumbersome to precisely control the applied volume of braze filler and/or the joint gap, particularly when joining large parts and/or parts having a lot of surface variation.

Another known technique for controlling the flow of excess braze liquid involves the use of braze stop coatings that are brushed or sprayed on selected surfaces to protect them from excess braze flow. For example, U.S. Pat. No. 4,439,250 teaches the use of a braze stop coating that is impervious braze flow. Although effective, braze stop coatings may be limited by the tendency of the excess braze liquid to flow around the protected areas. In addition, it may be a challenge to apply braze stop coatings without interfering with the integrity of the braze joint. Furthermore, the use of braze stop coatings may be labor intensive in some cases, as it may involve both the application of the braze stop coatings as well as removal of the coatings.

Clearly, there is a need for improved brazing strategies for controlling excess braze flow.

SUMMARY

In accordance with one aspect of the present disclosure, an assembly is disclosed. The assembly may comprise a first part including a first surface, and a second part including a second surface and a bottom edge having sloped regions and at least one well between the sloped regions. The assembly may further comprise a brazed joint joining the first surface to the second surface to provide the assembly. The at least one well may be configured to collect excess braze material from the brazed joint.

In another refinement, the sloped regions may be configured to direct a flow of the excess braze material from the braze joint to the at least one well.

In another refinement, gravity may assist the flow of the excess braze material from the brazed joint to the at least one well.

In another refinement, the at least one well may be positioned away from braze-sensitive features of the assembly.

In another refinement, the assembly may further comprise a collection capillary adjacent to the at least one well, and the collection capillary may be configured to collect the excess braze material from the at least one well.

In another refinement, the collection capillary may be removeable from the assembly.

In another refinement, the collection capillary may be formed integrally with the second part.

In another refinement, the collection capillary may be a structure selected from a hook, a pair of plates, a tube, and a hole in the first part.

In another refinement, the assembly may further comprise a braze stop coating on a portion of the first surface of the first part, and the braze stop coating may be configured to assist in directing the flow of the excess braze material to the at least one well.

In accordance with another aspect of the present disclosure, a method for fabricating an assembly having a brazed joint between a first surface of a first part and a second surface of a second part is disclosed. The second part may include a bottom edge having sloped regions and at least one well between the sloped regions. The method may comprise assembling the first surface with the second surface to define a joint gap therebetween, applying a braze filler to the joint gap, and orienting the first part and the second part so that the at least one well is pointed downwardly. The method may further comprise melting the braze filler to a braze liquid, allowing the braze liquid to flow through the joint gap, and allowing any excess braze liquid from the joint gap to flow along the sloped regions for collection at the at least one well. The method may further comprise allowing the braze liquid to cool and harden to provide the assembly having the brazed joint between the first part and the second part.

In another refinement, the method may further comprise attaching a collection capillary proximal to the at least one well prior to melting the braze filler to a braze liquid.

In another refinement, the method may further comprise allowing the excess braze liquid to flow from the at least one well into the collection capillary after allowing the excess braze liquid to flow along the sloped regions for collection at the at least one well.

In another refinement, the method may further comprise removing the collection capillary from the assembly after allowing the excess braze liquid to flow from the at least one well into the collection capillary.

In another refinement, the method may further comprise reclaiming the excess braze liquid from the collection capillary after removing the collection capillary from the assembly.

In another refinement, the collection capillary may be a structure selected from a hook, a pair of parallel plates, and a tube.

In another refinement, the second part may further include a collection capillary proximal to the at least one well.

In another refinement, the method may further comprise allowing the excess braze liquid to flow from the at least one well into the collection capillary after allowing the excess braze liquid to flow along the sloped regions for collection at the at least one well.

In another refinement, the first part may further include a hole located proximal to the at least one well.

In another refinement, the method may further comprise allowing the excess braze liquid to flow from the at least one well into the hole after allowing the excess braze liquid to flow along the sloped regions for collection at the at least one well.

In accordance with another aspect of the present disclosure, a method for fabricating an assembly having a brazed joint between a first surface of a first part and a second surface of a second part is disclosed. The method may comprise installing sloped regions and at least one well between the sloped regions along a bottom edge of the second part. The method may further comprise assembling the first surface with the second surface such that the at least one well is positioned away from braze-sensitive features of the assembly, and to define a joint gap between the first surface and the second surface. The method may further comprise melting the braze filler to a braze liquid, allowing the braze liquid to flow through the joint gap, and allowing any excess braze liquid from the joint gap to flow along the sloped regions for collection at the at least one well. The method may further comprise allowing the braze liquid to cool and harden to provide the assembly having the brazed joint between the first part and the second part.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the disclosure or the application and uses thereof. In this regard, it is to be additionally appreciated that the described embodiments are not limited to use with certain applications. Hence, although the present disclosure is, for convenience of explanation, described as certain illustrative embodiments, it will be appreciated that it can be implemented in various other types of embodiments and in various other systems and environments.

DETAILED DESCRIPTION

Figures 1, 2:
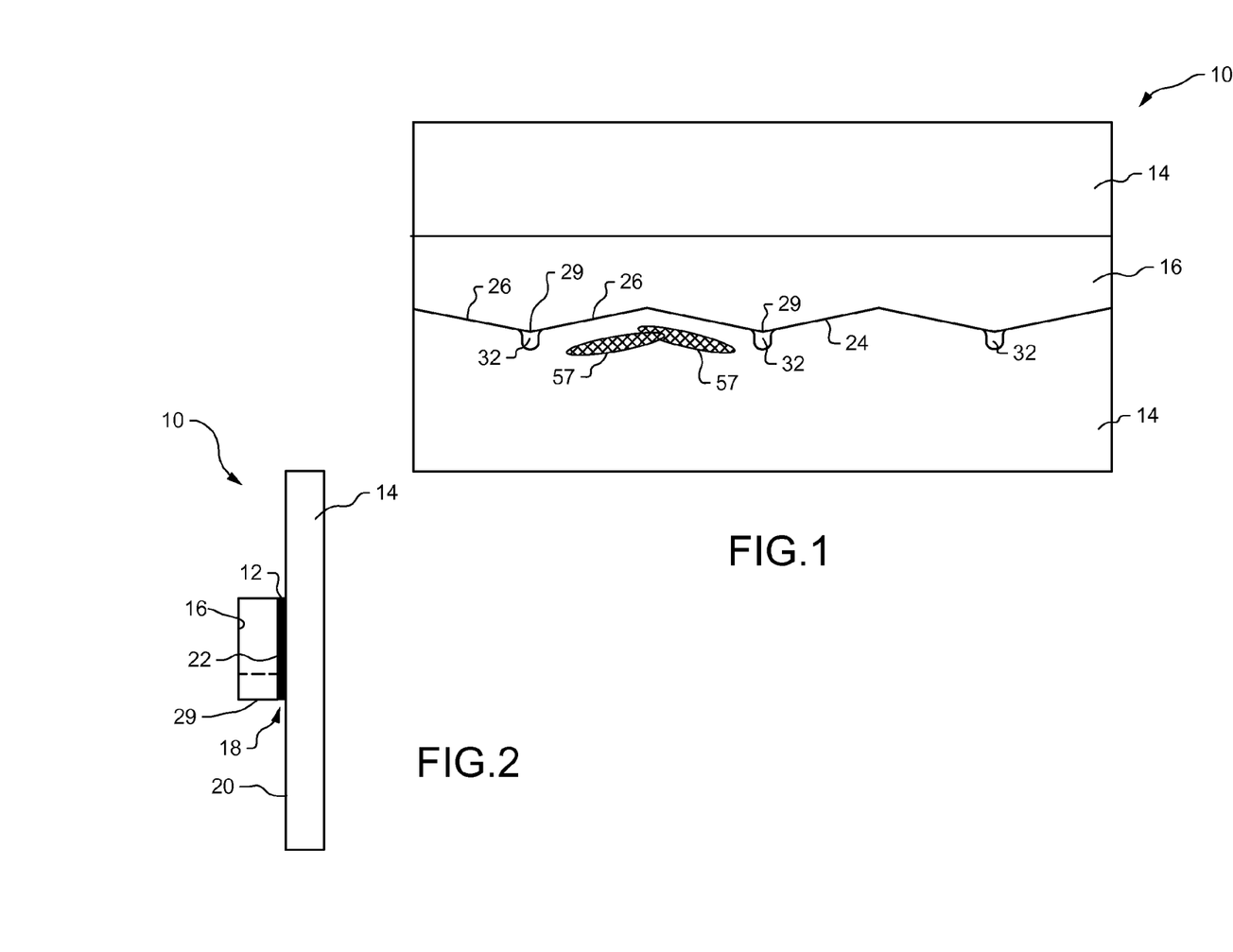
FIG. 1 is a top view of an assembly having a brazed joint between a first part and a second part, wherein the second part has wells for collection of excess braze material, constructed in accordance with the present disclosure.
FIG. 2 is a side view of the assembly of FIG. 1, constructed in accordance with the present disclosure.

Referring now to the drawings, and with specific reference to FIGS. 1-2, an assembly 10 having a brazed joint 12 between at least a first metallic part 14 and a second metallic part 16 is shown. It will be understood, however, that the assembly 10 may be formed from more than two parts in some circumstances. The brazed joint 12 may be located at a joint gap 18 between a first surface 20 of the first part 14 and a second surface 22 of the second part 16. Notably, the second part 16 may include a bottom edge 24 which may have sloped regions 26 and at least one well 29 between two of the sloped regions 26. If the assembly 10 is positioned with the bottom edge 24 of the second part 16 oriented downwardly during formation of the brazed joint 12, the well(s) 29 may serve as a collection point for any excess braze material 32 (see further details below). In particular, with the assistance of gravity, the sloped regions 26 may guide the excess braze material 32 to the well(s) 29 for collection. The well(s) 29 may be strategically positioned at specific locations of the assembly 10 so as to avoid the flow of the excess braze material 32 over any braze-sensitive features of the assembly 10. As used herein, 'braze-sensitive features' are any features of the assembly 10 whose functions may be interfered with by the accumulation of excess braze material thereon. For example, braze-sensitive features may include, but are not limited to, cooling holes, mating surfaces, fasteners, and/or high stress regions of the assembly 10. In particular, the well(s) 29 may be positioned away from braze-sensitive features to prevent the accumulation of the excess braze material 32 on such features.

Figures 3, 4, 5:
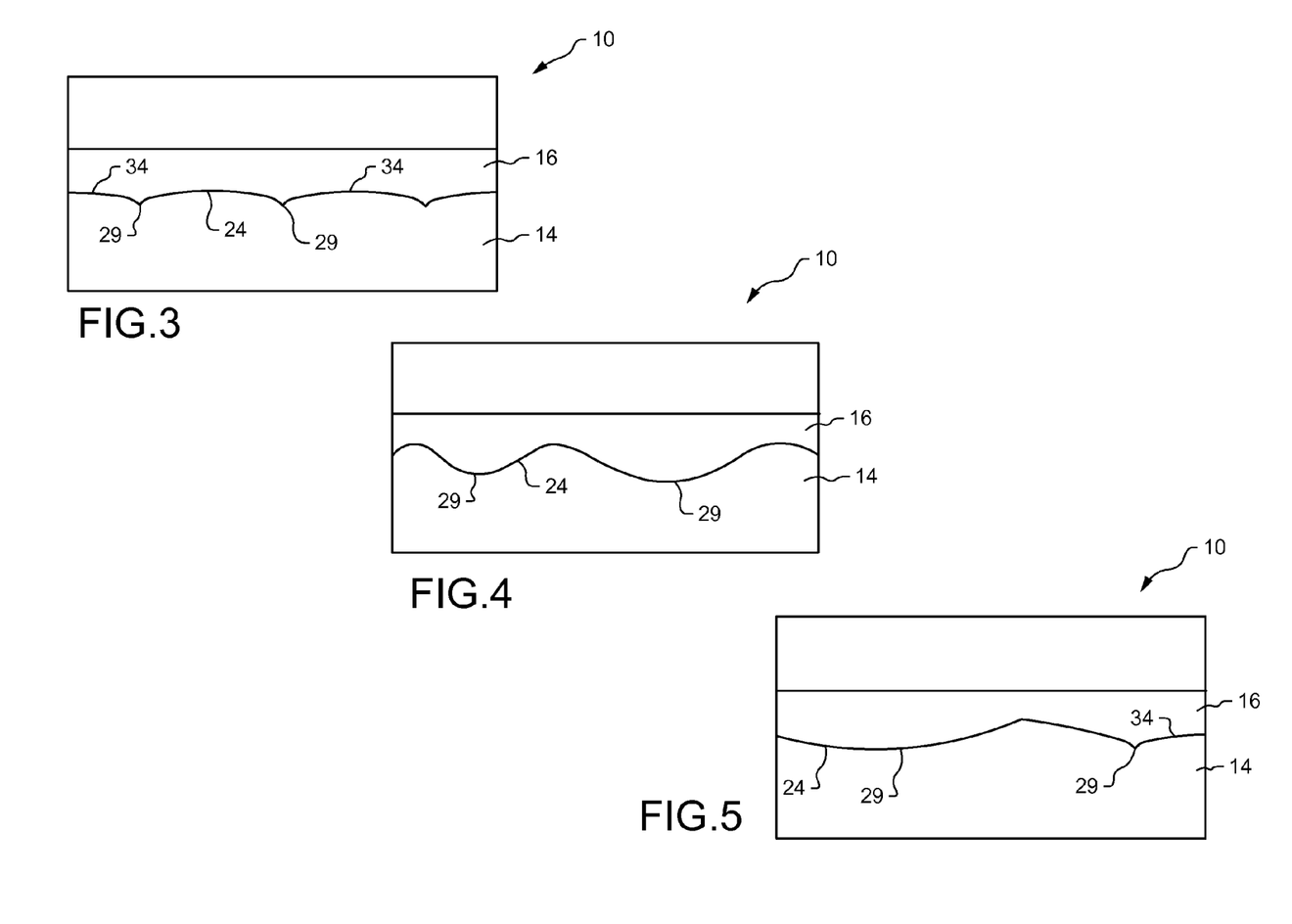
FIG. 3 is a top view of an assembly similar to FIG. 1 but having wells defined between arc-shaped regions, constructed in accordance with the present disclosure.
FIG. 4 is a top view of an assembly similar to FIG. 1 but having smooth wells, constructed in accordance with the present disclosure.
FIG. 5 is a top view of an assembly similar to the assemblies of FIGS. 2 and 3, but having a combination of a smooth well and a well defined between arc-shaped regions, constructed in accordance with the present disclosure.

Turning now to FIGS. 3-5, the well(s) 29 may have various alternative shapes. Although depicted as a sharp point between two sloped regions 26 in FIG. 1, the well(s) 29 may also be defined between two arc-shaped regions 34 along the bottom edge 24 (FIG. 3). Alternatively, the well(s) 29 may be smooth as shown in FIG. 4. As yet another possibility, the well(s) 29 may consist of a combination of one or more smooth wells and one or more wells defined between arc-shaped regions 34, as shown in FIG. 5. It will be appreciated that well(s) 29 may take on various configurations such as these as well other alternative configurations and combinations depending on numerous design considerations.

Figure 6:
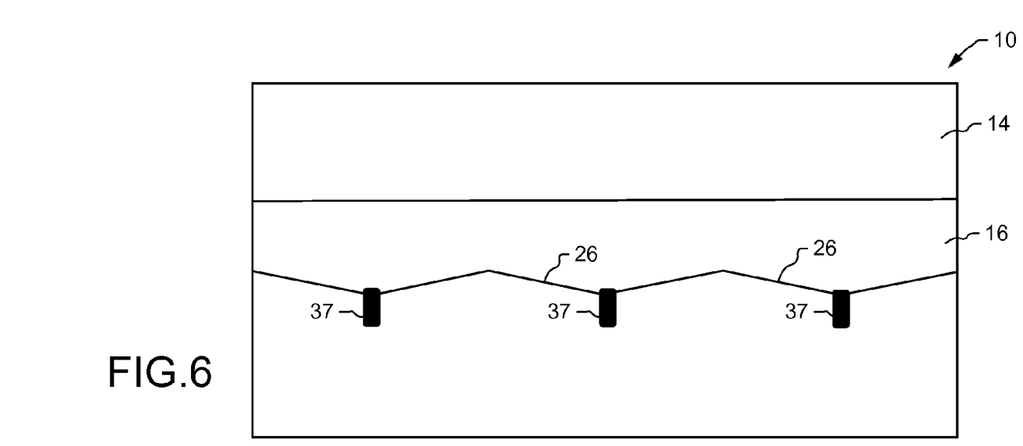
FIG. 6 is a top view of an assembly similar to FIG. 1, but having collection capillaries at the wells, constructed in accordance with the present disclosure.

Optionally, the assembly 10 may further include one or more collection capillaries 37 each associated with or located proximal to one of the wells 29, as shown in FIG. 6. The collection capillary 37 may draw the excess braze material 32 away from the nearest well 29 by capillary action (or wicking). The collection capillary 37 may be formed from a metallic material, such as a metallic material similar to or identical to the metallic material forming either of the parts 14 and 16. The collection capillary 37 may be attached to the well 29, or it may be formed as an integral detail on one of the parts 14 or 16 during their fabrication. Optionally, the collection capillary 37 may be sacrificial and may be removed from the assembly 10 after collection of the excess braze material 32 to allow the reclaiming of the excess braze material 32 if desired. The ability to reclaim the excess braze material 32 with the collection capillary 37 may provide economic advantages, particularly when precious metals (e.g., gold, silver, palladium, platinum) are included in the braze filler material.

Figure 7:
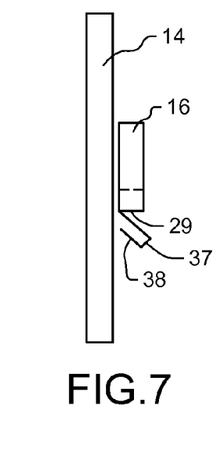
FIG. 7 is a side view of the assembly of FIG. 6, illustrating the collection capillary as a hook, constructed in accordance with the present disclosure.
Figure 8:
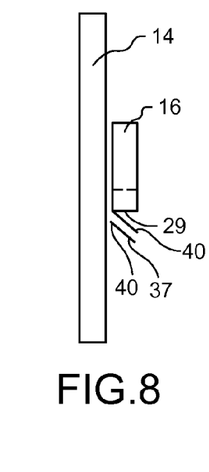
FIG. 8 is a side view similar to FIG. 7 but having two plates as the collection capillary, constructed in accordance with the present disclosure.
Figure 9:
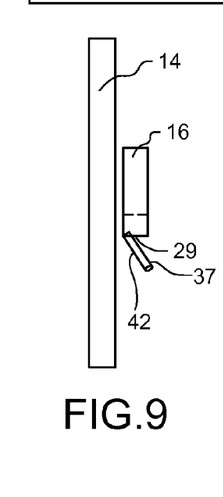
FIG. 9 is a side view similar to FIG. 7 but having a tube as the collection capillary, constructed in accordance with the present disclosure.
Figure 10:
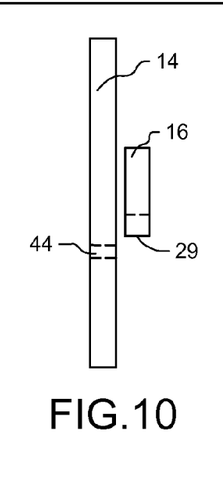
FIG. 10 is a side view similar to FIG. 7 but having a hole formed in the first part as the collection capillary, constructed in accordance with the present disclosure.

The collection capillaries 37 may have any structure capable of wicking the excess braze material 32 away from the wells 29. FIGS. 7-10 depict several possible structures that may be used as the collection capillary 37. As one possibility, the collection capillary 37 may be a hook 38 that draws in the excess braze liquid 32 by capillary action (FIG. 7). Alternatively, it may be formed between two metallic plates 40 (FIG. 8), or it may be a metallic tube 42 (FIG. 9). As yet another possibility, the collection capillary 37 may be a hole 44 formed in the first part 14 as shown in FIG. 10. In the latter case, the hole 44 may be positioned proximal to the well 29 so as to allow the excess braze material 32 to flow from the well 29 into the hole 44.

The volume of the collection capillary 37 (i.e., the holding capacity of the collection capillary) may be calculated according equation (1) below where $V_{capillary}$ is the volume of the collection capillary 37, and $\Delta V_{braze}$ is the difference between the theoretical braze filler volume ($V_{braze}$) and the applied braze filler volume. In other words, $V_{capillary}$ may be equal to (or greater than) the amount of braze filler volume used that exceeds the theoretical braze filler volume.

$$V_{capillary} = \Delta V_{braze} \quad (1)$$

The theoretical braze filler volume ($V_{braze}$) may be calculated from equation (2) below where $A_{joint}$ is the surface area of the brazed joint, and G is the width of the joint gap 18. Thus, the size (i.e., holding volume) of the collection capillary 37 may be adjusted according to the amount of excess braze filler material used ($\Delta V_{braze}$).

$$V_{braze} = A_{joint} \times G \quad (2)$$

Figure 11:
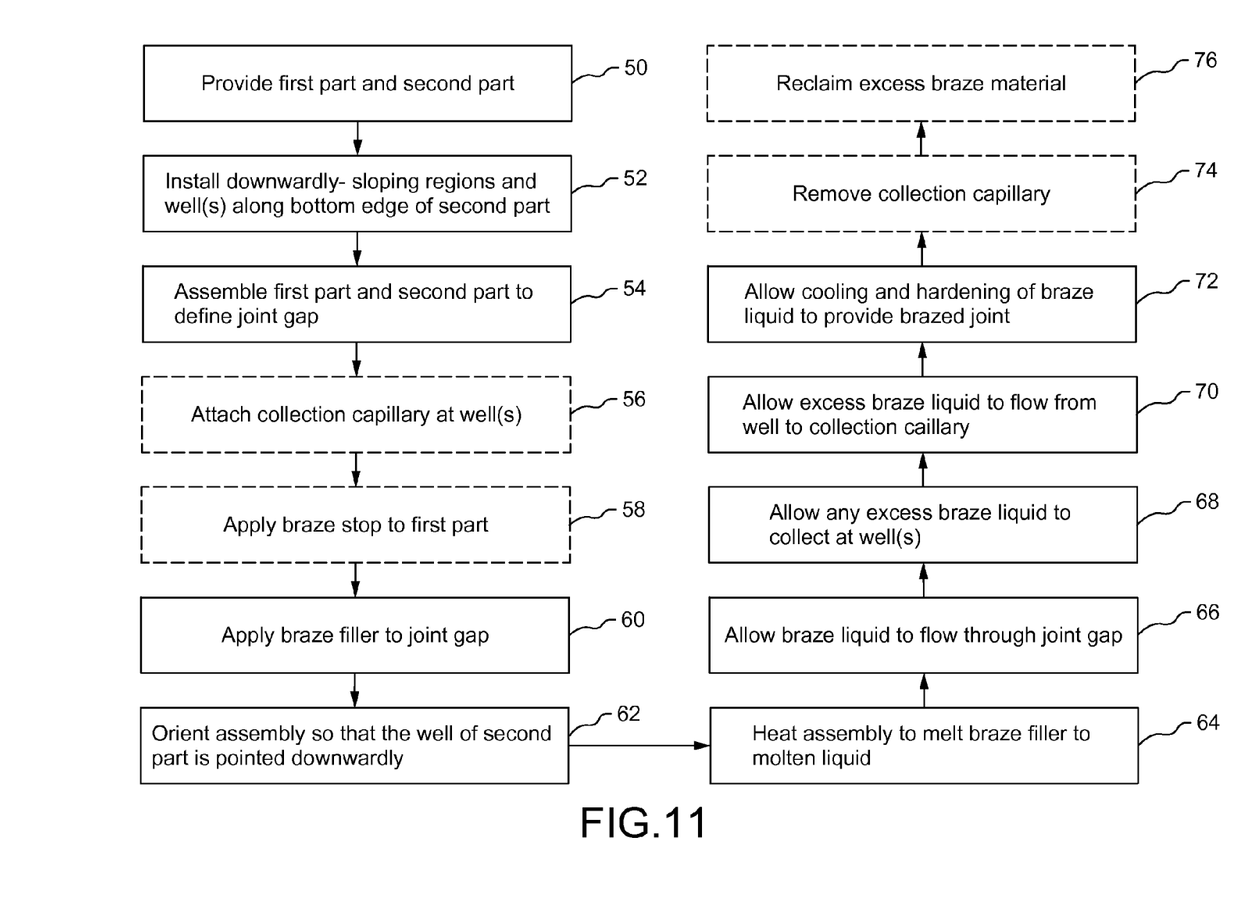
FIG. 11 is a flowchart illustrating a sample sequence of steps which may be involved in forming a brazed joint between two parts, in accordance with a method of the present disclosure.

Turning now to FIG. 11, a series of steps that may be involved in fabricating the assembly 10 having the brazed joint 12 between the first part 14 and the second part 16 is shown. Beginning with a first block 50, the first part 14 and the second part 16 may be provided. The sloped regions 26 and the well(s) 29 may then be installed along the bottom edge 24 of the second part 16 according to a next block 52. As explained above, the well(s) 29 may be integrally designed with the parts of the brazed assembly and may be strategically positioned so as to prevent the flow of any excess braze material to braze-sensitive locations on the assembly 10. The block 52 may be carried out using various cutting or machining processes apparent to those skilled in the art. The first part 14 may then be assembled with the second part 16 to define the joint gap 18 between the first surface 20 and the second surface 22 (block 54).

Optionally, one or more collection capillaries 37 may be attached to the second part 16 adjacent to a respective one of the wells 29 according to an optional block 56. Block 56 may be carried out using a clamp, tack welding, or any other suitable method apparent to those skilled in the art. Alternatively, the collection capillary 37 may be formed integrally with the first part 14 (e.g., as a hole in the first part) or integrally with the second part 16 during the block 56. For example, excess material along the bottom edge 24 of the second part 16 may be folded over to create a hook 38 or a tube 42 (see FIGS. 7 and 9). As another optional step, one or more braze stop coatings 57 may be applied to the first surface 20 of the first part 14 as an additional measure to protect the assembly 10 from excess braze flow (optional block 58) (see FIG. 1). In particular, the braze stop coating 57 may protect the coated surface of the first part 14 from excess braze flow. In addition, the location of the braze stop coating(s) 57 on the assembly 10 may be chosen such that the braze stop coating(s) 57 may assist in directing the flow of excess braze material to the well(s) 29 and/or the collection capillaries 37.

A braze filler may then be applied to the joint gap 18 (block 60), and the parts 14 and 16 may positioned so that the well(s) 29 of the second part 16 are pointed downwardly (block 62). According to the following blocks 64 and 66, the braze filler may be melted to a braze liquid, and the braze liquid may be permitted to flow through the joint gap 18 and wet the surfaces 20 and 22. In addition, any excess braze liquid may be permitted to flow along the sloped regions 26 and collect at the wells 29 with gravity assistance (block 68). If collection capillaries 37 are used, the excess braze liquid may also be permitted to flow from the wells 29 into the collection capillaries 37 by capillary action (optional block 70). Once the braze liquid is sufficiently distributed across the joint gap 18, it may be allowed to cool and harden to provide the brazed joint 12 between the two parts 14 and 16 according to a block 72. If collection capillaries 37 are used, they may be optionally removed according to an optional block 74. For example, the collection capillaries may be removed by shearing, milling, machining, lasering, or another material removal process apparent to those skilled in the art. Furthermore, the excess braze material may be reclaimed from the collection capillaries 37 and used for further brazing processes according to an optional block 76.

It will be understood that steps shown in FIG. 11 may be carried out in various alternative orders without interfering with the desired control over excess braze material flow. For example, the application of the braze filler (block 60) may be performed after orienting the assembly 10 so that the well(s) 29 are pointed downwardly (block 62). It will be understood that variations such as these are included within the scope of the present disclosure.

Figure 12:
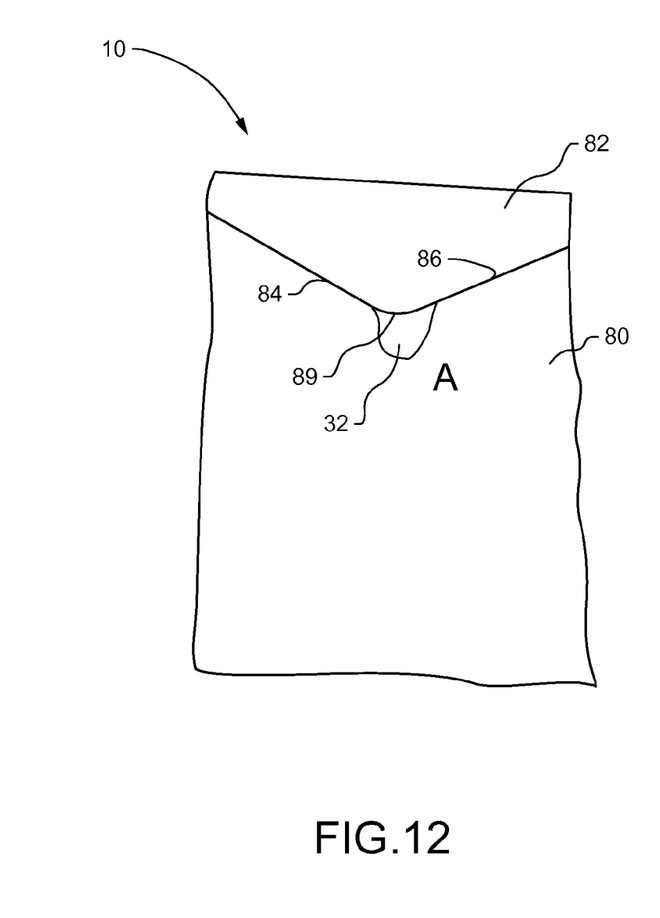
FIG. 12 is a photograph of an assembly having a brazed joint between a first part and a second part prepared in accordance with the methods of the present disclosure.
Figure 13:
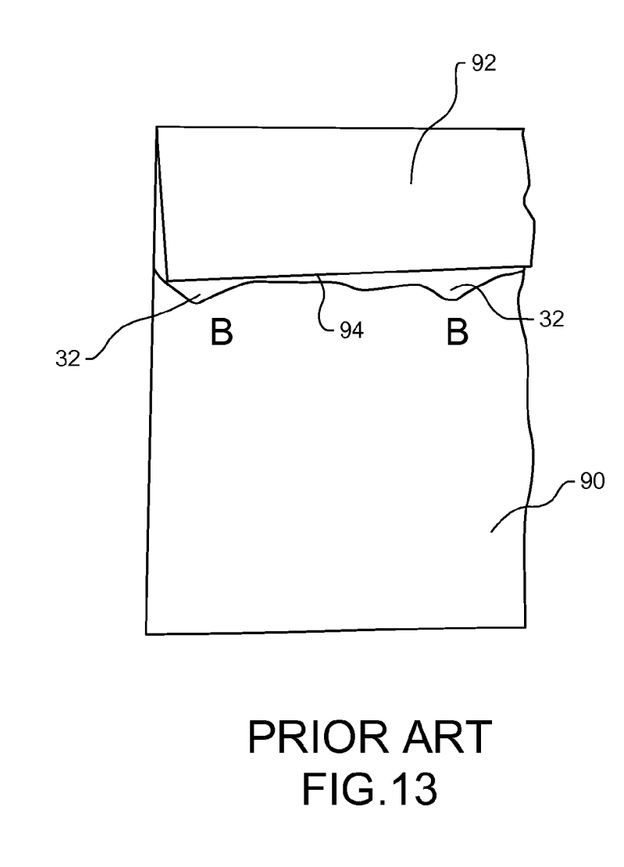
FIG. 13 is a photograph of an assembly having a brazed joint between two parts prepared according to the prior art.

An example of an assembly 10 prepared according to the methods of the present disclosure is depicted in FIG. 12. The assembly 10 was fabricated using a first metallic part 80 and a second metallic part 82 with a bottom edge 84 having sloped regions 86 and a well 89 between the sloped regions 86. The melted braze filler was permitted to flow between the parts 80 and 82 with the bottom edge 84 of the second part 82 oriented downwardly to allow gravity to assist the flow of the excess braze material 32 to the well 89. As can be seen, all of the excess braze material 32 collected at the well 89 of the assembly (collection point 'A'). This is in contrast with an assembly prepared in accordance with the prior art (see FIG. 13). Specifically, the assembly of FIG. 13 was fabricated using a first part 90 and a second part 92 having a flat bottom edge 94. As can be seen, the excess braze material 32 dripped randomly in the assembly prepared in accordance with the prior art (collection points 'B'). Thus, the design strategy disclosed herein may be used to control the flow of excess braze material and direct it to designated regions of an assembly.

INDUSTRIAL APPLICABILITY

In general, it can therefore be seen that the technology disclosed herein has industrial applicability in a variety of settings including, but not limited to, applications using assemblies having a brazed joints between metallic parts. The technology disclosed herein implements part design features that enable the control of excess braze material flow to specified locations on the assembly. Specifically, the technology disclosed herein uses the assistance of gravity and strategically-positioned sloped regions and one or more wells along a bottom edge of one of the parts to guide the flow of the excess braze material to the wells. The position of the wells may be designed to direct the flow of the excess braze material away from any braze-sensitive features on the assembly. Optional collection capillaries may also be installed or formed integrally with one of the parts near the wells to allow the collection of the excess braze material from the wells. In addition, the collection capillaries may be removed from the assembly upon completion of the braze cycle to allow the reclaiming of the excess braze material for additional braze processes. This feature may have economic advantages, particularly when using expensive braze filler elements. The brazing strategy disclosed herein may be particularly advantageous for forming brazed joints between parts having geometries that make it difficult to control braze flow using the braze filler volume and the joint gap alone, such as large parts and/or parts having high surface variation. One non-limiting example would be for the manufacture of gas turbine engine parts, although a myriad of other applications exist. For example, it may be useful for forming brazed joints between panels or features of an afterburner liner of a gas turbine engine, or an exhaust nozzle liner of a gas turbine engine. It is expected that the technology disclosed herein may find wide industrial applicability in a wide range of areas such as, but not limited to, aerospace and automotive applications, power generation applications, and construction applications.

What is claimed is:

1. An assembly, comprising:
a first part including a first surface;
a second part including a second surface and a bottom edge having sloped regions and at least one well between the sloped regions;
a brazed joint joining the first surface to the second surface to provide the assembly, the at least one well being configured to collect excess braze material from the brazed joint; and
a collection capillary adjacent to the at least one well, and wherein collection capillary is configured to collect the excess braze material from the at least one well;
wherein the sloped regions are configured to direct a flow of the excess braze material from the braze joint to the at least one well; and
wherein gravity assists the flow of the excess braze material from the braze joint to the at least one well.

2. The assembly of claim 1, wherein the at least one well is positioned away from braze-sensitive features of the assembly.

3. The assembly of claim 1, wherein the collection capillary is removable from the assembly.

4. The assembly of claim 1, wherein the collection capillary is formed integrally with the second part.

5. The assembly of claim 1, wherein the collection capillary is a structure selected from a hook, a pair of plates, a tube, and a hole in the first part.

6. The assembly of claim 1, further comprising a braze stop coating on a portion of the first surface of the first part, the braze stop being configured to assist in directing the flow of the excess braze material to the at least one well.

7. A method for fabricating an assembly having a brazed joint between a first surface of a first part and a second surface of a second part, the second part including a bottom edge having sloped regions and at least one well between the sloped regions, comprising:
assembling the first surface with the second surface to define a joint gap there between;
applying a braze filler to the joint gap;
orienting the first part and the second part so that the at least one well is pointed downwardly;
attaching a collection capillary proximal to the at least one well prior to melting the braze filler to a braze liquid;
melting the braze filler to a braze liquid;
allowing the braze liquid to flow through the joint gap;
allowing any excess braze liquid from the joint gap to flow along the sloped regions for collection at the at least one well; and
allowing the braze liquid to cool and harden to provide the assembly having the brazed joint between the first part and the second part.

8. The method of claim 7, further comprising allowing the excess braze liquid to flow from the at least one well into the collection capillary after allowing the excess braze liquid to flow along the sloped regions for collection at the at least one well.

9. The method of claim 8, further comprising removing the collection capillary from the assembly after allowing the excess braze liquid to flow from the at least one well into the collection capillary.

10. The method of claim 9, further comprising reclaiming the excess braze liquid from the collection capillary after removing the collection capillary from the assembly.

11. The method of claim 8, wherein the collection capillary is a structure selected from a hook, a pair of parallel plates, and a tube.

12. The method of claim 7, wherein the second part further includes a collection capillary proximal to the at least one well.

13. The method of claim 12, further comprising allowing the excess braze liquid to flow from the at least one well to the collection capillary after allowing the excess braze liquid to flow along the sloped regions for collection at the at least one well.

14. The method of claim 7, wherein the first part further includes a hole located proximal to the at least one well.

15. The method of claim 14, further comprising allowing the excess braze liquid to flow from the at least one well into the hole after allowing the excess braze liquid to flow along the sloped regions for collection at the at least one well.

16. A method for fabricating an assembly having a brazed joint between a first surface of a first part and a second surface of a second part, comprising:

installing sloped regions and at least one well between the sloped regions along a bottom edge of the second part;

assembling the first surface with the second surface such that the at least one well is positioned away from braze-sensitive features of the assembly, and to define a joint gap between the first surface and the second surface;

applying a braze filler to the joint gap;

orienting the first part and the second part so that the at least one well is pointed downwardly;

melting the braze filler to a braze liquid;

allowing the braze liquid to flow through the joint gap;

allowing any excess braze liquid from the joint gap to flow along the sloped regions for collection at the at least one well;

allowing the excess braze liquid to flow from the at least one well into a collection capillary after allowing the excess braze liquid to flow along the sloped regions for collection at the at least one well; and allowing the braze liquid to cool and harden to provide the assembly having the brazed joint between the first part and the second part.

\* \* \* \* \*